United States Patent [19]

McCord

[11] Patent Number: 4,569,727

[45] Date of Patent: Feb. 11, 1986

[54] VAPOR GENERATING AND RECOVERY APPARATUS FOR VAPORIZING AND CONDENSING AT LEAST TWO LIQUID COMPONENTS HAVING DIFFERENT VAPORIZING TEMPERATURES

[76] Inventor: James W. McCord, 9101 Nottingham Pkwy., Louisville, Ky. 40222

[21] Appl. No.: 549,155

[22] Filed: Nov. 7, 1983

[51] Int. Cl.$^4$ .............................................. B01D 5/00
[52] U.S. Cl. ........................................ 203/87; 203/98; 203/100; 202/170; 202/180; 202/182; 202/185 R; 202/197; 202/186; 202/202
[58] Field of Search ................... 202/185 R, 170, 202, 202/180, 186, 182, 197, 235; 203/100, 98, 2, 87

[56] References Cited

U.S. PATENT DOCUMENTS

| | | | |
|---|---|---|---|
| 1,701,988 | 2/1929 | Torrey, Jr. et al. | 202/154 |
| 2,961,398 | 11/1960 | Woddill | 202/368 |
| 3,375,177 | 3/1968 | Rand | 202/186 |
| 3,410,339 | 11/1968 | Wiegandt | 202/186 |
| 3,461,039 | 8/1969 | Starmer | 202/186 |
| 4,003,798 | 1/1977 | McCord | 203/2 |
| 4,078,974 | 3/1978 | McCord | 202/186 |
| 4,348,261 | 9/1982 | Saari | 203/71 |
| 4,394,216 | 7/1983 | McCord | 202/170 |

FOREIGN PATENT DOCUMENTS 2004192 3/1979 United Kingdom ............ 202/185 R

Primary Examiner—S. Leon Bashore
Assistant Examiner—V. Manoharan
Attorney, Agent, or Firm—Charles G. Lamb

[57] ABSTRACT

An apparatus and method for vaporizing and recovering, by condensation, a composite liquid solution of at least two components having substantially different vaporizing temperatures. The apparatus includes at least one liquid condensate vaporizing chamber wherein the vapor of the lower vapor point component will be condensed from a vapor zone above the vapor zone of the vapor of the higher vapor point component. The apparatus further includes at least two weir or other means to define the vapor levels of each vaporized component and the condensing means for each component are disposed on the opposite side of the weir from the vapor zone.

9 Claims, 3 Drawing Figures

4,569,727

VAPOR GENERATING AND RECOVERY APPARATUS FOR VAPORIZING AND CONDENSING AT LEAST TWO LIQUID COMPONENTS HAVING DIFFERENT VAPORIZING TEMPERATURES

BACKGROUND OF THE INVENTION (1) Field of the Invention

The present invention relates to a vapor generating and recovering apparatus for vaporizing and recovering a liquid solution. More particularly, the present invention relates to a vapor generating and recovery apparatus for vaporizing a liquid solution of at least two components having substantially different vaporizing temperatures in at least one vaporizing chamber and condensing the vaporized components in a condensing chamber wherefrom it is reintroduced into the vaporizing chamber.

(2) Description of the Prior Art

In surface treating items, such as coating or cleaning items, the items are immersed into a hot boiling solution. The treating solution often is toxic or caustic and typically extremely hot due to the fact that the treating solutions have high boiling or vaporizing temperatures.

Vapor generating and recovery apparatus capable of vaporizing and condensing a solution having two immiscible components are known. One example of such an apparatus is taught by U.S. Pat. No. 4,394,216 for vaporizing and recovering a liquid mixture of water, an immiscible solvent and an emulsifying agent. The liquid mixture is boiled in a first chamber at a temperature above the boiling or vaporizing temperature of the water and immiscible solvent and below the boiling or vaporizing temperature of the emulsifying agent. The vaporized water and immiscible solvent are condensed in a second chamber, and the condensate transferred back to the first chamber wherein the liquid mixture is again vaporized.

SUMMARY OF THE INVENTION

The present invention provides an apparatus for vaporizing a liquid mixture of at least two components having two substantially different vaporizing temperatures in at least one vaporizing chamber wherein the vapor of the component having the lower vaporizing temperature will be located in a zone overlaying the zone of vapor of the component having the higher vaporizing temperature. In the use of the term "component" this may include a miscible composition of two or more liquids. And, the term "vaporizing temperature" may include the "boiling temperature" of the component composition.

The present invention further provides an apparatus including at least one condensing chamber for condensing the vapor of both components and returning the condensate to the vaporizing chamber for reuse.

More particularly, the present invention provides an apparatus and method for vaporizing a liquid mixture of at least two components having substantially different vaporizing temperatures and condensing the vaporized components comprising a housing having at least one vaporizing chamber wherein the liquid mixture is vaporized and at least one condensing chamber wherein the vaporized components are condensed, means for adding heat to the at least one vaporizing chamber, means for removing heat at two different elevations in the at least one condensing chamber, and means for transferring condensate from the at least one condensing chamber to the at least one vaporizing chamber.

BRIEF DESCRIPTION OF THE DRAWINGS

These and other features of the present invention will become even more clear upon reference to the following description and in conjunction with the accompanying drawings wherein like numerals refer to like parts throughout the Figures and in which.

DETAILED DESCRIPTION OF THE EMBODIMENTS

Figure 1:
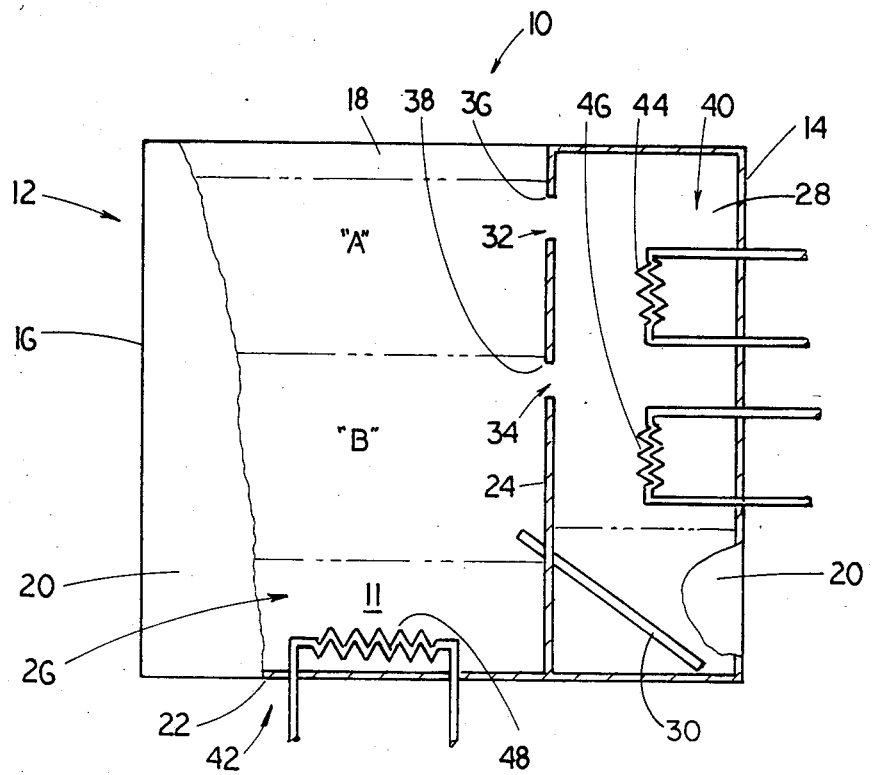
FIG. 1 is a side cross-sectional view of one advantageous embodiment of a vapor generating and recovery apparatus of the present invention.

FIG. 1 illustrates a vapor generating and recovery apparatus of the present invention, generally denoted as the number 10, for vaporizing and recovering a liquid mixture 11 of at least two components having two substantially different vaporizing temperatures, comprising a housing 12 having two end walls 14 and 16, two side walls 18 and 20, and a floor 22. A wall 24 is located in the housing 12 spaced from the end wall 14 spanning the distance between the side walls 18 and 20 dividing the housing interior into a vaporizing chamber 26 and a condensing chamber 28.

The condensing chamber 28 is in liquid flow communication with the vaporizing chamber 26 by means of a conduit 30. The conduit 30 is shown angularly disposed to the vertical with its lower end (inlet end) near the bottom of the condensing chamber 28, and its upper end (outlet end) at a preselected position above the normal operating level of the liquid mixture 11 in the vaporizing chamber 26.

In operation of the apparatus 10, when the liquid mixture 11 is caused to boil or vaporize, as will be hereinafter discussed, the component having the lower vaporizing temperature will vaporize first and migrate upwardly in the vaporizing chamber 26 and the component having the higher vaporizing temperature will vaporize second and also migrate upwardly in the vaporizing chamber 26. As the component having the higher vaporizing temperature vaporizes, it will lift the overlaying vapor of the lower vaporizing temperature component to a first vapor zone "A" while the vapor of the higher vaporizing temperature component occupies a second vapor zone "B" below the first vapor zone "A".

The apparatus 10 further includes first means, generally denoted as the numeral 32, for transferring vapor of the lower vaporizing temperature component from the vapor zone "A" into the condensing chamber 28, and second means, generally denoted as the numeral 34, for transferring vapor of the higher vaporizing temperature component from the vapor zone "B" into the condensing chamber 28. Because the vapor zone "A" overlays the vapor zone "B", the first vapor transferring means 32 is at a higher elevation that the second vapor transferring means 34. As shown, the first vapor transferring means 32 is illustrated as a weir or a first aperture 36 formed through the wall 24 located at a first elevation establishing vapor flow communication from the vapor zone "A" into the condensing chamber 28. Similarly, the second vapor transferring means 34 is illustrated as a weir or a second aperture 38 formed through the wall 24 located at a second elevation establishing vapor flow communication from the vapor zone "B" into the condensing chamber 28. For the reason that the vapor zone "A" is above the vapor zone "B", the weir or first aperture 36 of the first vapor transferring means 32 is at a higher elevation than is the weir or aperture 38 of the second vapor transferring means 34.

The apparatus 10 includes vapor condensing means, generally denoted as the numeral 40, for removing heat at the two different elevations in the condensing chamber 28 to condense the vapor of the lower vaporizing temperature component in the condensing chamber at the higher or first elevations and the vapor of the higher vaporizing temperature component in the condensing chamber at the second or lower of the elevations, and liquid vaporizing means, generally denoted as the numeral 42, for adding heat to the vaporizing chamber 26 to vaporize the liquid 11 contained in the vaporizing chamber 26. As shown, the vapor condensing means 40 includes two heat absorbing coils 44 and 46 located in the condensing chamber 28 at two different elevations therein. The first vapor condensing coil 44 maintains a preselected temperature in the condensing chamber 28 at the aperture 36 below the vaporizing temperature of the liquid component having the lower vaporizing temperature, and the second vapor condensing coil 46 maintains a preselected temperature in the condensing chamber 28 at the aperture 38 below the vaporizing temperature of the liquid component having the higher vaporizing temperature. Preferably, the second condensing coil 46 maintains a preselected temperature below the vaporizing temperature of the vapor in zone "A" so that the condensed vapor from zone "A" does not re-vaporize. The first coil 44 is located below the aperture 36 through the wall 24 so that vapors of the lower vaporizing temperature component flowing from the vapor zone "A" into the condensing chamber 28 will pass over the first vapor condensing coil 44 and be thereby condensed. The second coil 46 is located below the aperture 38 through the wall 24 so that the vapors of the higher vaporizing temperature component flowing from the vapor zone "B" into the condensing chamber 28 pass over the second vapor condensing coil 46 and is thereby condensed. When the level of the condensate in the condensing chamber 28 reaches a level equal to the level of the outlet end of the conduit 30, the condensate will flow through the conduit 30 from the condensing chamber 28 to the vaporizing chamber 26 wherein it is vaporized. The liquid vaporizing means 42 is shown as a heat emitting coil 48 located in the vaporizing chamber 26 above the floor 22 and below the normal operating level of the liquid 11 contained in the vaporizing chamber 26. The heat emitting coil 48 provides sufficient heat to vaporize the component of the liquid 11 having the higher vaporizing temperature. The means for providing heat to the heat emitting coil 48 and the means for removing heat from the vapor condensing coils 44 and 46 may be any known in the art.

Figure 2:
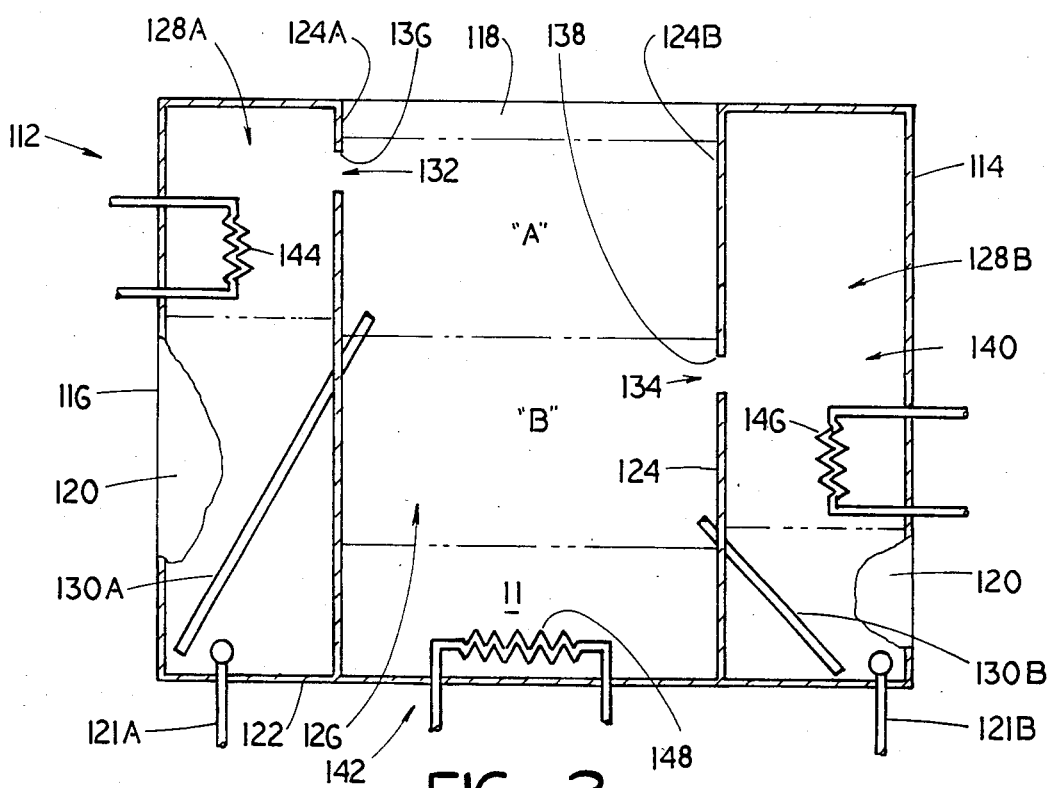
FIG. 2 is a side cross-sectional view of another advantageous embodiment of a vapor generating and recovery apparatus of the present invention; and, FIG. 3 is a side cross-sectional view of still another advantageous embodiment of a vapor generating and recovery apparatus of the present invention.

FIG. 2 illustrates another advantageous embodiment of the vapor generating and recovery apparatus of the present invention, generally denoted as the number 110 for vaporizing and recovering a liquid mixture 11 of at least two components having two substantially different vaporizing temperatures. The apparatus 110 comprises a housing 112 having two end walls 114 and 116, two side walls 118 and 120, and a floor 122. Two walls 124A and 124B are located in the housing 112 at opposite ends. The wall 124A is spaced from the end wall 116 spanning the distance between the side walls 118 and 120 to define a first condensing chamber 128A at one end of the housing 112, and the wall 124B is spaced from the end wall 114 spanning the distance between the side walls 118 and 120 to define a second condensing chamber 128B at the other end of the housing 112. The interior of the housing between the walls 124A and 124B defines a vaporizing chamber 126.

The first condensing chamber 128A is in liquid flow communication with the vaporizing chamber 126 by means of a conduit 130A. The conduit 130A is shown as angularly disposed to the vertical with its lower end (inlet end) near the bottom of the first condensing chamber 128A, and its upper end (outlet end) at a preselected position above the normal operating level of the liquid mixture 11 in the vaporizing chamber 126. The second condensing chamber 128B is in liquid flow communication with the vaporizing chamber 126 by means of a conduit 130B. The conduit 130B is shown as angularly disposed to the vertical with its lower end (inlet end) near the bottom of the second condensing chamber 128B, and its upper end (outlet end) at a preselected position above the normal operating level of the liquid mixture 11 in the vaporizing chamber 126.

In operation of the apparatus 110, when the liquid mixture 11 is caused to vaporize, the component having the lower vaporizing temperature will vaporize first and migrate upwardly in the vaporizing chamber 126, and the component having the higher vaporizing temperature will vaporize second and also migrate upwardly in the vaporizing chamber 126. As the component having the higher vaporizing temperature vaporizes, it will lift the overlaying vapor of the lower vaporizing temperature component to a first vapor zone "A" while the vapor of the higher vaporizing temperature component occupies a second vapor zone "B" below the first vapor zone "A". As shown, the outlet end of the conduit 130A in the vaporizing chamber 126 is located above the vapor zone "B".

The apparatus 110 further includes first means, generally denoted as the numeral 132, for transferring vapor of the lower vaporizing temperature component from the vapor zone "A" into the first condensing chamber 128A, and second means, generally denoted as the numeral 134, for transferring vapor of the higher vaporizing temperature component from the vapor zone "B" into the second condensing chamber 128B. Because the vapor zone "A" overlays the vapor zone "B", the first vapor transferring means 132 is at a higher elevation than the second vapor transferring means 134. As shown, the first vapor transferring means 132 is illustrated as a weir or first aperture 136 formed through the wall 124A located at an elevation establishing vapor flow communication from the vapor zone "A" into the first condensing chamber 128A. Similarly, the second vapor transferring means 134 is illustrated as a weir or second aperture 138 formed through the wall 124B located at an elevation establishing vapor flow communication from the vapor zone "B" into the second condensing chamber 128B. To provide for the vapor zone "A" being above the vapor zone "B", the first aperture 136 of the first vapor transferring means 132 is at a higher elevation than the second aperture 138 of the second vapor transferring means 134.

The apparatus 110 includes vapor condensing means, generally denoted as the numeral 140, for removing heat from the condensing chambers 128A and 128B at the two different elevations to condense the vapor of the lower vaporizing temperature component in the first condensing chamber 128A at the first or higher of the elevations and the vapor of the higher vaporizing temperature component in the second condensing chamber 128B at the second or lower of the elevations. The apparatus 110 also includes liquid vaporizing means, generally denoted as the numeral 142, for adding heat to the vaporizing chamber 126 to vaporize the liquid 11 contained in the vaporizing chamber 126. As shown, the vapor condensing means 140 includes two heat absorbing coils 144 and 146. The first coil 144 is located in the first condensing chamber 128A below the vapor flow through aperture 136 through the wall 124A so that the vapor of the lower vaporizing temperature component flowing from the vapor zone "A" into the first condensing chamber 128A will pass over the first vapor condensing coil 144 and be thereby condensed. The second vapor condensing coil 146 is located in the second condensing chamber 128B below the vapor flow through aperture 138 through the wall 124B so the vapor of the higher vaporizing temperature component flowing from the vapor zone "B" into the second condensing chamber 128B will pass over the second vapor condensing coil 146 and be thereby condensed. Toward this end, the first vapor condensing coil 144 maintains a preselected temperature in the first condensing chamber 128A near the aperture 136 below the vaporizing temperature of the liquid component having the lower vaporizing temperature, and the second vapor condensing coil 146 maintains a preselected temperature in the second condensing chamber 128B near the aperture 138 below the vaporizing temperature of the liquid component having the higher vaporizing temperature. When the level of the condensate in the first condensing chamber 128A reaches a level equal to the level of the outlet end of the conduit 130A, the condensate will flow through the conduit 130A from the first condensing chamber 126 above the vapor zone "A". The vapor of the component occupying vapor zone "A" being at a higher temperature than the vaporizing temperature of the condensed liquid component flowing from the first condensing chamber 128A causes the condensate from zone "B" to vaporize. When the level of the condensate in the second condensing chamber 128B reaches a level equal to the level of the outlet end of the conduit 130B, the condensate will flow through the conduit 130B from the second condensing chamber 128B into the vaporizing chamber 126 wherein it is vaporized. The liquid vaporizing means 142 for chamber 126 is shown as a heat emitting coil 148 in the vaporizing chamber 126 above the floor 122 and below the normal operating level of the liquid 11 contained in the vaporizing chamber 126. The heat emitting coil 148 provides sufficient heat to vaporize the component of the liquid 11 having the higher vaporizing temperature. The means for providing heat to the heat emitting coil 148 and the means for removing heat from the vapor condensing coils 144 and 146 may be any known in the art.

Figure 3:
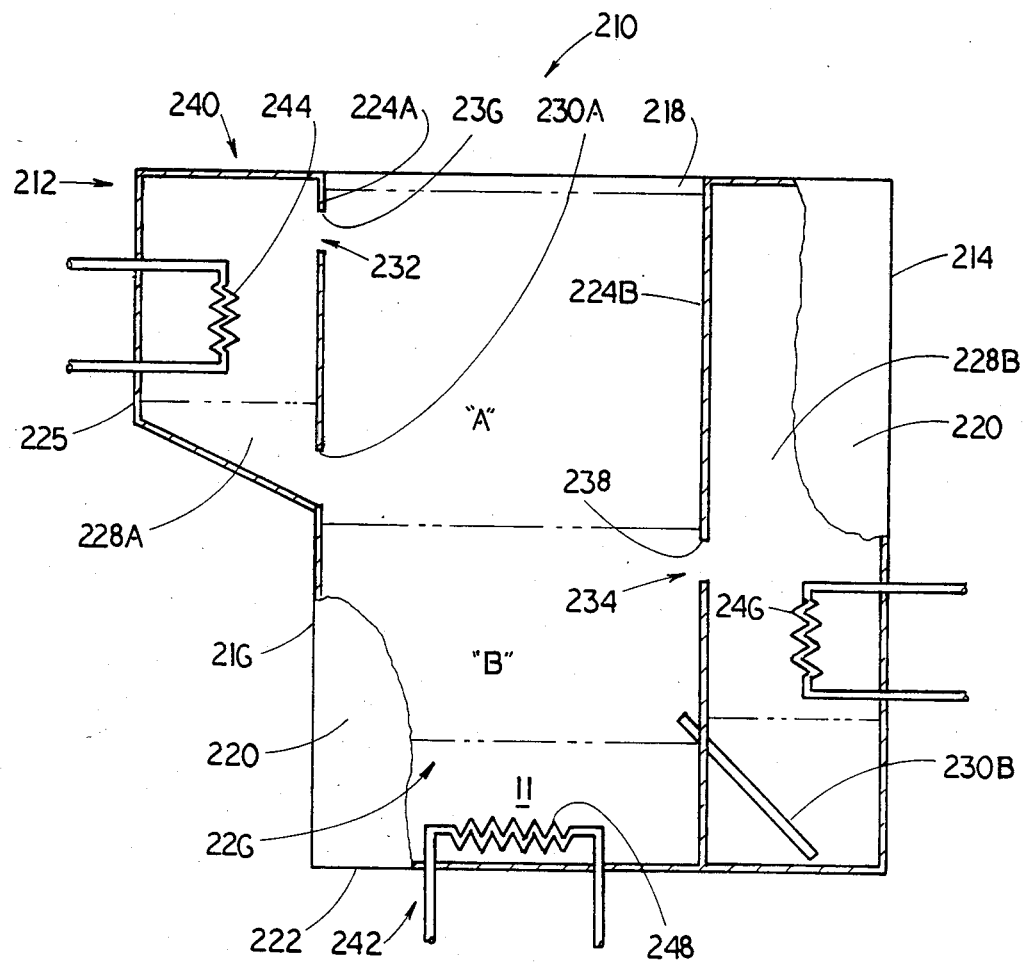

FIG. 3 illustrates a further advantageous embodiment of a vapor generating and recovery apparatus of the present invention, generally denoted as the numeral 210, for vaporizing and recovering a liquid mixture 11 of at least two components having two substantially different vaporizing temperatures. The apparatus 210 comprises a housing 212 having two end walls 214 and 216, two side walls 218 and 220, and a floor 222. The housing end wall 216 is formed with an outwardly projecting bay 225 near the top thereof with the floor of the bay 225 slanting downwardly toward the vertical section of the end wall 216 therebelow. Two walls 224A and 224B are located in the housing 212 at opposite ends. The wall 124A is located over the entrance of the bay 225 spanning the distance between the side walls 218 and 220 to define a first condensing chamber 228A at one end of the housing 212, and a wall 224B is spaced from the end wall 214 spanning the distance between the housing side walls 218 and 220 to define a second condensing chamber 228B at the other end of the housing 212. The interior of the housing between the walls 224A and 224B defines a vaporizing chamber 226.

The first condensing chamber 228A is in liquid flow communication with the vaporizing chamber 226 by means of a weir or a liquid flow-through opening 230A in the wall 224A just above the slanting floor of the bay 225. The second condensing chamber 228B is in liquid flow communication with the vaporizing chamber 226 by means of a conduit 230B. The conduit 230B is shown as angularly disposed to the vertical with its lower end (inlet end) near the bottom of the second condensing chamber 228B, and its upper end (outlet end) at a preselected position above the normal operating level of the liquid mixture 11 in the vaporizing chamber 226.

In operation of the apparatus 210, when the liquid mixture vaporizes, the component having the lower vaporizing temperature will vaporize first and migrate upwardly in the vaporizing chamber 226, and the component having the higher vaporizing temperature will vaporize second and also migrate upwardly in the vaporizing chamber 226. As the component having the higher vaporizing temperature vaporizes, it will lift the overlaying vapor of the lower vaporizing temperature component to a first vapor zone "A" while the vapor of the higher vaporizing temperature component occupies a second vapor zone "B" below the first vapor zone "A". It should be noted, that the condensate outlet openin 230A in the wall 224A of the first condensing chamber 228A is above the second vapor zone "B".

The apparatus 210 further includes first means, generally denoted as the numeral 232, for transferring vapor of the lower vaporizing temperature component from the first vapor zone "A" into the first condensing chamber 228A, and second means, generally denoted as the numeral 234, for transferring vapor of the higher vaporizing temperature component from the vapor zone "B" into the second condensing chamber 228B. Because the vapor zone "A" overlays the vapor zone "B", the first vapor transferring means 232 is at a higher elevation than the second vapor transferring means 234. As shown, the first vapor transferring means 232 comprises a weir or an aperture 236 formed through the wall 224A located above the condensate output opening 230A and at an elevation establishing vapor flow communication from the vapor zone "A" into the first condensing chamber 228A. Similarly, the second vapor transferring means 234 is illustrated as a weir or an aperture 238 formed through the wall 224B located at an elevation establishing vapor flow communication from the vapor zone "B" into the second condensing chamber 228B. For the reason that the vapor zone "A" is above the vapor zone "B", the aperture 236 of the first vapor transferring means 232 is at a higher elevation than is the aperture 238 of the second vapor transferring means 234.

The apparatus 210 includes vapor condensing means for removing heat from the condensing chambers 228A and 228B at two different elevations to condense the vapor of the lower vaporizing temperature component in the first condensing chamber 228A and condense the vapor of the higher vaporizing temperature component in the second condensing chamber 228B. The apparatus 210 also includes liquid vaporizing means, generally denoted as the numeral 242, for adding heat to the vaporizing chamber 226 to vaporize the liquid 11 contained in the vaporizing chamber 226. As shown, the vapor condensing means includes two heat absorbing coils 244 and 246. The first coil 244 is located in the first condensing chamber 228A below the vapor flow-through aperture 236 through the wall 224A so that the vapor of the lower boiling temperature component flowing from the vapor zone "A" into the first condensing chamber 228A will pass over the first vapor condensing coil 244 and be thereby condensed. The second vapor condensing coil 246 is located in the second condensing chamber 228B below the vapor flow through aperture 238 through the wall 224B so that the vapor of the higher vaporizing temperature component flowing from the vapor zone "B" into the second condensing chamber 228B will pass over the second vapor condensing coil 246 and be thereby condensed. Toward this end, the first vapor condensing coil 244 maintains a preselected temperature in the first condensing chamber 228A near the aperture 236 below the vaporizing temperature of the liquid component having the lower vaporizing temperature, and the second vapor condensing coil 246 maintains a preselected temperature in the second condensing chamber 228B near the aperture 238 below the vaporizing temperature of the liquid component having the higher vaporizing temperature. The condensate in the first condensing chamber 228A will flow through the condensate outlet opening 230A from the first condensing chamber 238A into the vaporizing chamber 226 above the vapor zone "A". The vapor of the component occupying vapor zone "A" being at a higher temperature than the vaporizing temperature of the condensed liquid component flowing from the first condensing chamber 228A causes the condensate from zone "B" to vaporize. When the level of the condensate in the second condensing chamber 228B reaches a level equal to the level of the outlet end of the conduit 230B, the condensate will flow through the conduit 230B from the second condensing chamber 228B into the vaporizing chamber 226 wherein it is vaporized by the vaporizing means 242. The liquid vaporizing means 242 is shown as a heat emitting coil 248 in the vaporizing chamber 226 above the floor 222 and below the normal operating level of the liquid 11 contained in the vaporizing chamber 226. The heat emitting coil 248 provides sufficient heat to vaporize the component of the liquid 11 having the higher vaporizing temperature. The means for removing heat from the first and second vapor condensing coils 244 and 246 and the means for adding heat to the heat emitting coil 248 may be any means known in the art.

In one particularly advantageous embodiment the vapor of the higher vaporizing temperature component of the liquid mixture 11 in vapor zone "B" may often be toxic or caustic and very hot, for example, on the order of 400° F. The cooler vapor of the lower vaporizing temperature component of the liquid mixture 11 in vapor zone "A" functions as a barrier to prevent the caustic or toxic vapor in vapor zone "B" from escaping the housing. Further, the cooler vapor in vapor zone "A" protects a workman who may reach into the housing of the apparatus from being burned by the hot, caustic vapor in vapor zone "B" as he is only exposed to the cooler, non-toxic, non-caustic vapor in vapor zone "A".

It is realized that various obvious changes may be made to the embodiments described without departing from the scope and spirit of the present described invention.

What is claimed is:

1. An apparatus for vaporizing a liquid mixture of at least two components having different vaporizing temperatures, and condensing the vaporized components, comprising:

a housing consisting of a floor, side walls, end walls and a wall located in the housing between the end walls and spanning the distance between the side walls dividing the housing into a vaporizing chamber wherein the liquid mixture is vaporized, and a condensing chamber wherein the vaporized components are condensed;

means for adding heat to the vaporizing chamber for vaporizing the liquid in the vaporizing chamber;

a first aperture in the dividing wall in the housing at a first elevation for transferring vapor of the component having the lower vaporizing temperature from the vaporizing chamber to the condensing chamber;

a second aperture in the dividing wall in the housing at a second elevation below the first elevation for transferring vapor of the component having the higher vaporizing temperature from the vaporizing chamber to the condensing chamber;

means for removing heat at the two different elevations in the condensing chamber for condensing the vapor component having the lower vaporizing temperature in the condensing chamber at the first elevation and for condensing the vapor of the component having the higher vaporizing temperature in the condensing chamber at the second elevation; and, means for transferring the condensate from the condensing chamber to the vaporizing chamber.

2. The apparatus of claim 1, wherein the heat removing means at both elevations maintain a temperature below the vaporizing temperature of the component having the lower vaporizing temperature.

3. The apparatus of claim 1, wherein:

the means for removing heat at the higher of the two elevations maintains a temperature below the vaporizing temperature of the component having the lower vaporizing temperature; and, the means for removing heat at the lower of the two elevations maintains a temperature below the vaporizing temperature of the component having the higher vaporizing temperature.

4. The apparatus of claim 3, wherein the means for removing heat at the lower of the two elevations maintains a temperature above the vaporizing temperature of the component having the lower vaporizing temperature.

5. An apparatus for vaporizing a liquid mixture of at least two components having different vaporizing temperatures, and condensing the vaporized components, comprising:

a housing consisting of a floor, side walls, end walls, and two spaced apart walls located in the housing dividing the housing into a vaporizing chamber wherein the liquid mixture is vaporized, and two condensing chambers located to opposite sides of the vaporizing chamber;

means for adding heat to the vaporizing chamber for vaporizing the liquid in the vaporizing chamber;

a first aperture in one of the dividing walls in the housing at a first elevation for transferring vapor of the component having the lower vaporizing temperature from the vaporizing chamber into a first one of the condensing chambers;

a second aperture in the other one of the dividing walls in the housing at a second elevation below the first elevation of the first aperture for transferring vapor of the component having the higher vaporizing temperature from the vaporizing chamber into a second one of the condensing chambers; and, means for removing heat located in the first one of the condensing chambers for condensing the component having the lower vaporizing temperature and means for removing heat located in the second one of the condensing chambers for condensing the component having the higher vaporizing temperature.

6. The apparatus of claim 1, further comprising:

condensate transferring means for transferring condensate from the first condensing chamber to the vaporizing chamber having a condensate outlet communicating with the vaporizing chamber at a predetermined elevation; and, condensate transferring means for transferring condensate from the second condensing chamber to the vaporizing chamber having a condensate outlet communicating with the vaporizing chamber at a predetermined elevation at a lower elevation than the condensate outlet from the first condensing chamber.

7. The apparatus of claim 6, wherein the condensate outlet from the second condensing chamber is above the normal operating level of the liquid mixture in the vaporizing chamber.

8. The apparatus of claim 6, wherein the condensate outlet from the first condensing chamber is located above the layer of vapor in the vaporizing chamber having the higher vaporizing temperature.

9. A method for vaporizing a liquid mixture of at least two components having different vaporizing temperatures, and condensing the vaporized components comprising the steps of:

vaporizing said liquid mixture in vaporizing chamber;

condensing one component of said mixture at one elevation in one vapor condensing chamber, and condensing the other component of said mixture at another elevation in another vapor condensing chamber; and, returning said condensed vapors to said vaporizing chamber in two separate streams.

* * * * *